Nov. 3, 1970 — C. H. GERLACH — 3,537,293
TOOL FOR CLINCHING C-RINGS
Filed July 19, 1968 — 6 Sheets-Sheet 2

INVENTOR.
CARL H. GERLACH
BY
Woodling, Krost, Granger & Rent
Attys

Nov. 3, 1970 — C. H. GERLACH — 3,537,293
TOOL FOR CLINCHING C-RINGS
Filed July 19, 1968 — 6 Sheets-Sheet 3

INVENTOR.
CARL H. GERLACH
BY
Woodling Krost Granger + Krost
Attys

Nov. 3, 1970     C. H. GERLACH     3,537,293

TOOL FOR CLINCHING C-RINGS

Filed July 19, 1968     6 Sheets-Sheet 5

INVENTOR.
CARL H. GERLACH
BY
Woodling Kurt Granger + Kurt
attys.

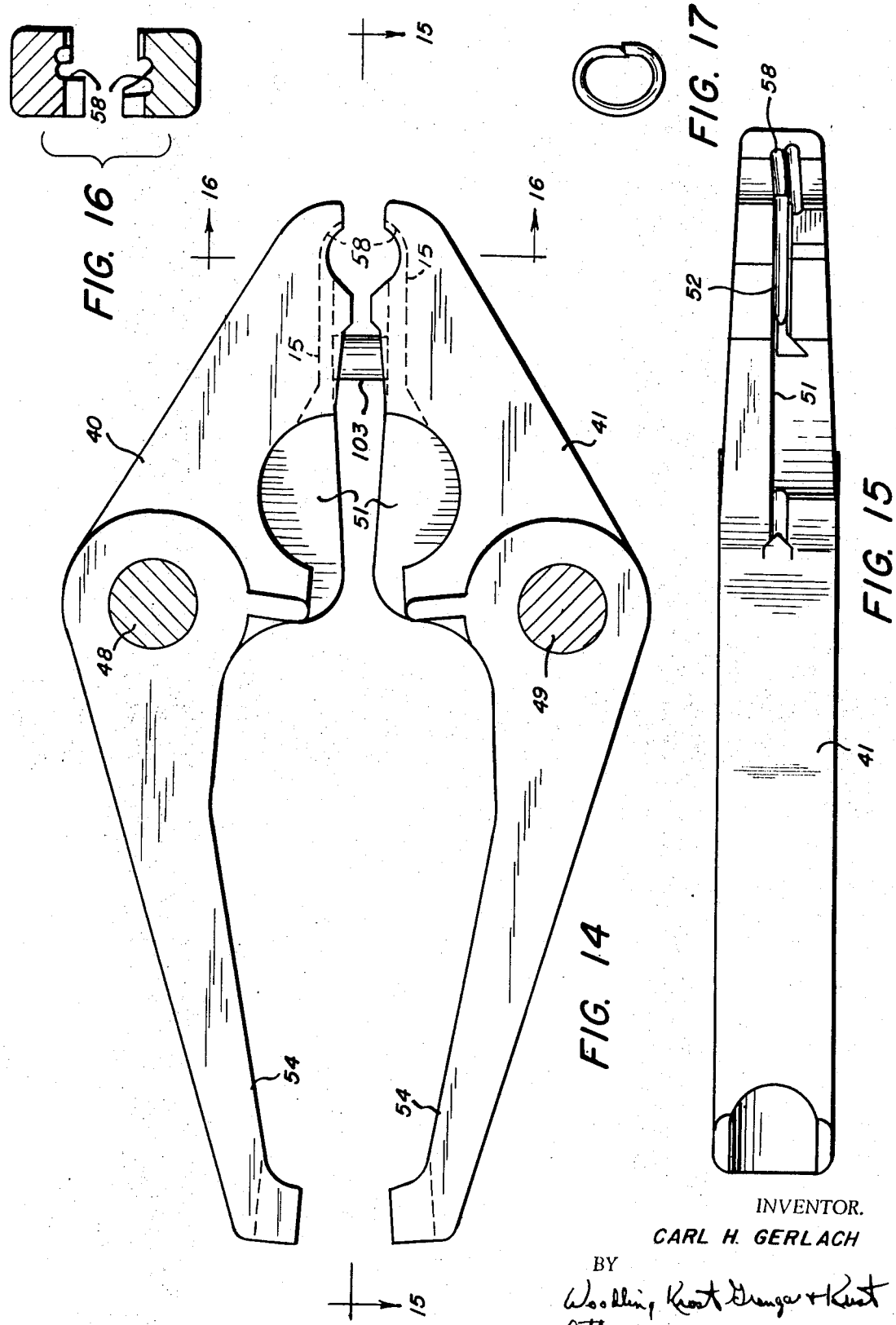

United States Patent Office 3,537,293
Patented Nov. 3, 1970

3,537,293
TOOL FOR CLINCHING C-RINGS
Carl H. Gerlach, Solon, Ohio, assignor to Cooper Industries, Inc., a corporation of Ohio
Filed July 19, 1968, Ser. No. 746,051
Int. Cl. B21d 7/06
U.S. Cl. 72—407                    5 Claims

ABSTRACT OF THE DISCLOSURE

A C-ring clinching device having an improved feeding arrangement for feeding C-rings one at a time from a magazine to clinching surfaces on first and second pivotally mounted jaws. The improved construction comprises a magazine shoe member which is constantly urged to engage a reference or entrance surface formed on the jaws. The shoe member has spaced first and second cam surfaces thereon and these cam surfaces are adapted to be engaged either by the C-ring or by first and second cam members carried by a feeder blade which travels generally at right angles to the shoe member in pushing C-rings along ring feeding grooves formed in the jaws to reach the clinching surfaces on the jaws. When a C-ring is present on the entrance surface the feeder blade engages the C-ring and the C-ring engages the spaced first and second cam surfaces to retract the shoe member. The device also includes an adjustable blade stop so that various sizes of C-rings may be accommodated and properly closed by the jaws.

---

The objects and advantages of the invention will be understood from the following detailed description of a preferred embodiment thereof, with reference being made to the drawings in which:

FIG. 3 is a view taken generally along the line 3—3 of FIG. 1;

FIG. 14 is an elevational view of the jaws of the present device in closed position;;

FIG. 15 is a view taken generally along the line 15—15 of FIG. 14;

FIG. 16 is a view taken generally along the line 16—16 of FIG. 14; and

FIG. 17 is a view of a ring produced in FIG. 14.

Figure 1:
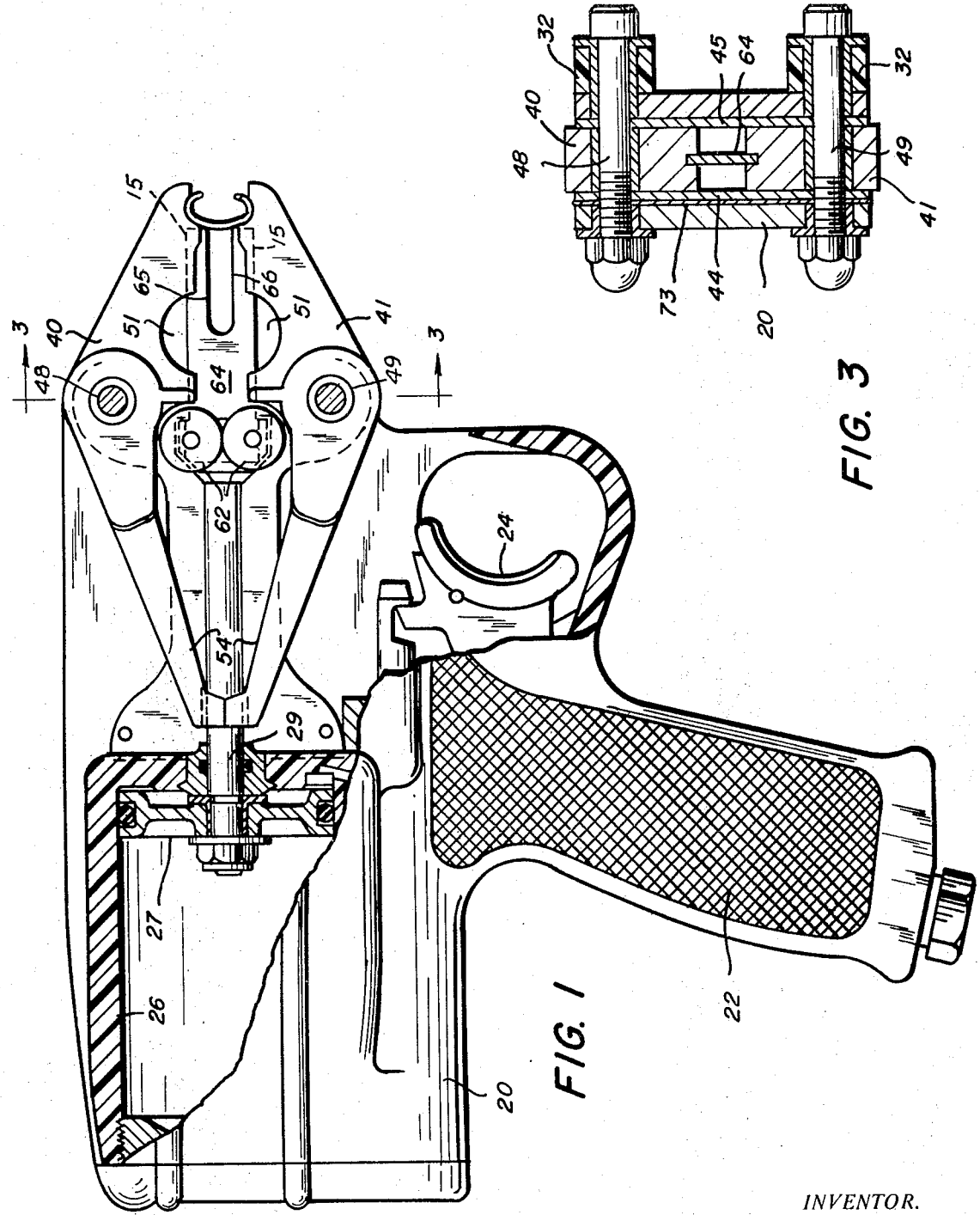
FIG. 1 is a side elevational view partially in section showing the tool of the present invention.
Figure 2:
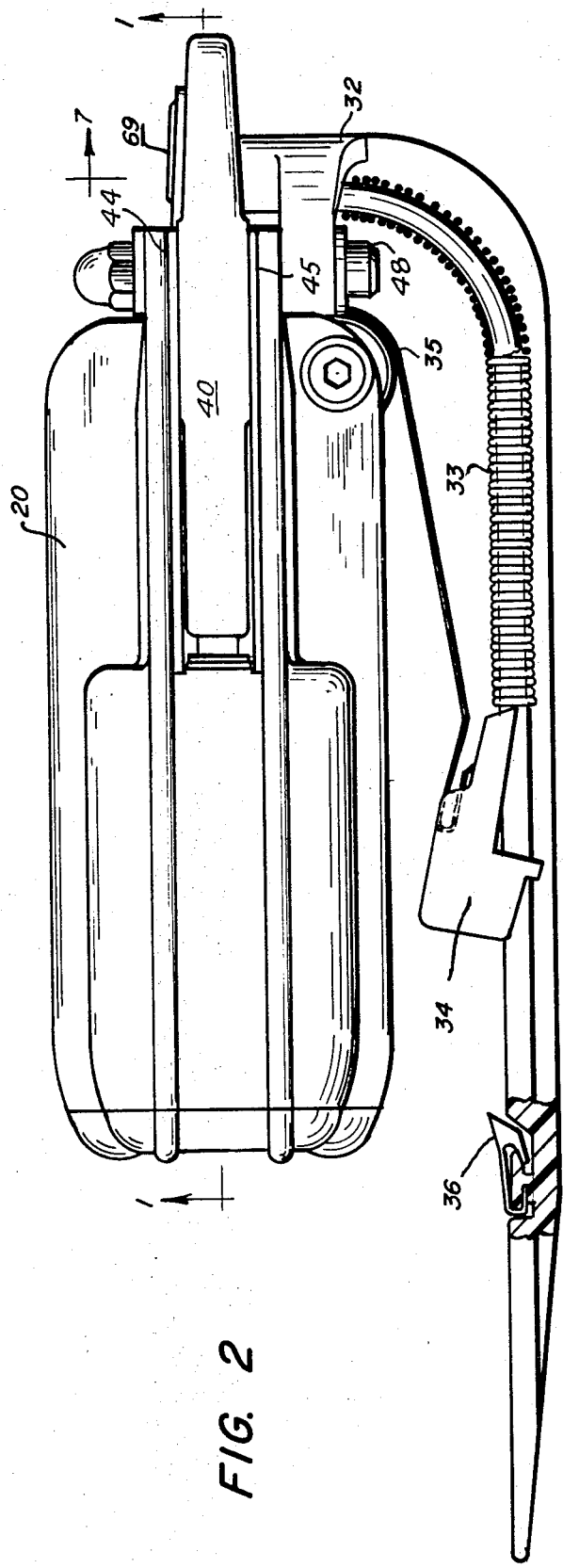
FIG. 2 is a plan view of the tool shown in FIG. 1.

Referring to FIGS. 1 and 2, the tool of the present invention for clinching C-rings may otherwise be referred to a hog ringer or cage ringer and as shown in the accompanying drawings, includes a housing 20 which comprises a pistol grip type handle 22 and a trigger 24. Located within the housing is a cylinder 26 within which is reciprocably mounted a piston 27. The mechanism for introducing air into the cylinder on the desired side of the piston 27 has not been shown and will not be described in detail hereinafter except to say that pulling the trigger 24 causes the piston 27 to move to the left in the cylinder 26 and release of the trigger 24 by an operator of the tool causes air to be introduced into the left end of the cylinder 26 with subsequent travel of the piston 27 to the position shown in FIG. 1. The piston 27 has a piston rod 29 secured thereto and the piston rod 29 carries the operating structure of the device as will be described in more detail hereinafter.

A C-ring magazine 32 is secured to the housing 20 (not shown in FIG. 1) by bolts which will be described in more detail hereinafter which bolts also serve to pivotally mount the jaws of the tool. The magazine 32 is adapted to carry a supply of C-rings 33 on its cross section as clearly shown in FIGS. 2 and 7. A pusher 34 is constantly urged to the right, as seen in FIG. 2, by means of a spring 35 which tends to keep the C-rings 33 snugged up so that a C-ring 33 will always be ready to present itself when the tool is actuated. A catch 36 prevents C-rings 33 from falling off the entrance end of the magazine 32.

The tool at the working end thereof or the right end as seen in FIGS. 1 and 2, comprises first and second jaws 40 and 41, respectively. FIG. 3 best shows the mounting of jaws 40 and 41 and this includes first and second sides plates 44 and 45, respectively, which serve to sandwich the jaws therebetween, and first and second pivot members 48 and 49 in the form of bolts extend through the housing 20, the side plates 44 and 45, jaw bushings not numbered, and the jaws 40 and 41 to secure the assembly in position as shown. Each of the jaws 40 and 41 are provided with wall means which define an entrance surface 51 in the sense that is the surface which the side of a C-ring engages as it passes underneath a magazine shoe 75, hereinafter described. A continuation of these wall means serve to define opposed ring feeding grooves 52, best seen in FIGS. 14–16, on the facing portions of the jaws 40 and 41 which terminate at the extreme right end of the tool in clinching surfaces 58. The opposite ends of the jaws 40 and 41 from the clinching surfaces 58 are each provided with cam surfaces, both identified by the reference numeral 54 and these cam surfaces are adapted to be engaged by rollers 62 carried on an extension of the piston rod 29. It will be apparent that upon movement of the piston and piston 27 rod 29 to the left from the position shown in FIG. 1 that engagement of rollers 62 with cam surfaces 54 will cause closing of the clinching surfaces 58 with subsequent clinching of a C-ring 33 carried thereby.

Figure 9:
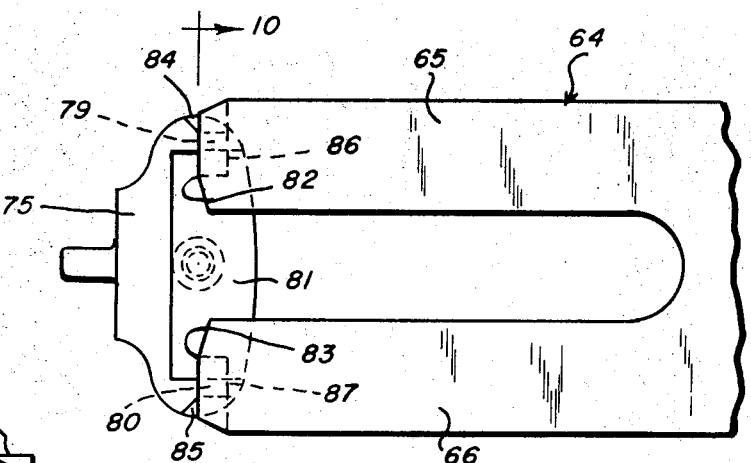
FIG. 9 is a view taken generally along the line 9—9 of FIG. 8.
Figure 10:
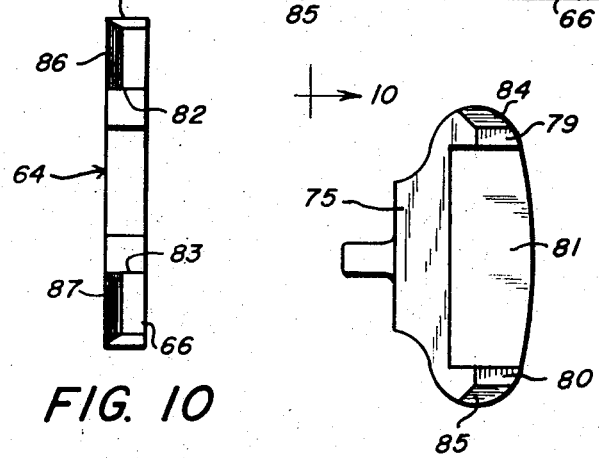
FIG. 10 is an end view of the feeder blade.

Also attached to and carried by the extension of the piston rod 29 is a feeder blade 64 which serves the basic function of pushing a C-ring 33 from the entrance surface 51 along the grooves 52 to the clinching surfaces 58. This feeder blade 64 is bifurcated so as to form first and second spaced portions 65 and 66, respectively. As best seen in FIGS. 9–10, the first portion 65 of the feeder blade 64 is provided with a first C-ring engaging edge 82 and a first cam member 86. The second portion 66 is provided with a second C-ring engaging edge 83 and a second cam member 87.

Figure 7:
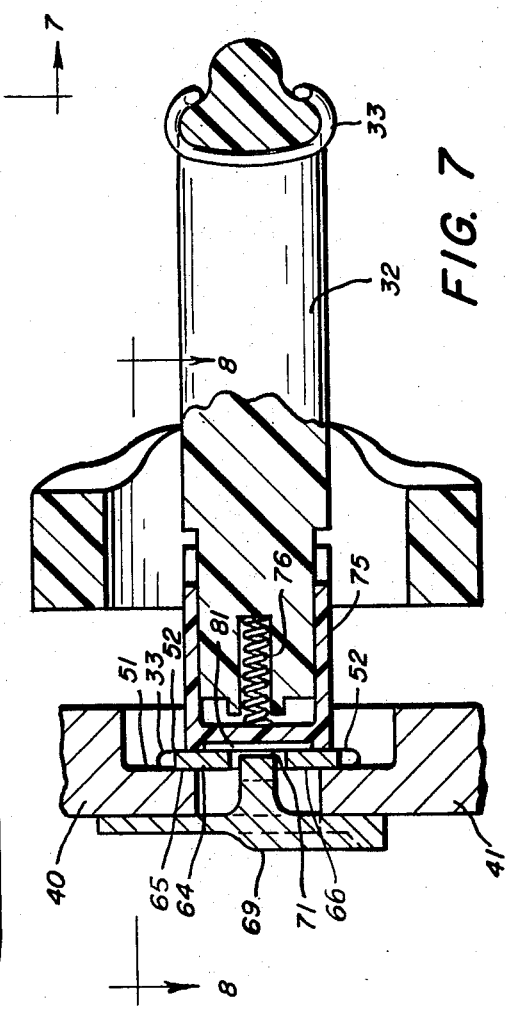
FIG. 7 is a view taken along the line 7—7 of FIG. 2.
Figure 8:
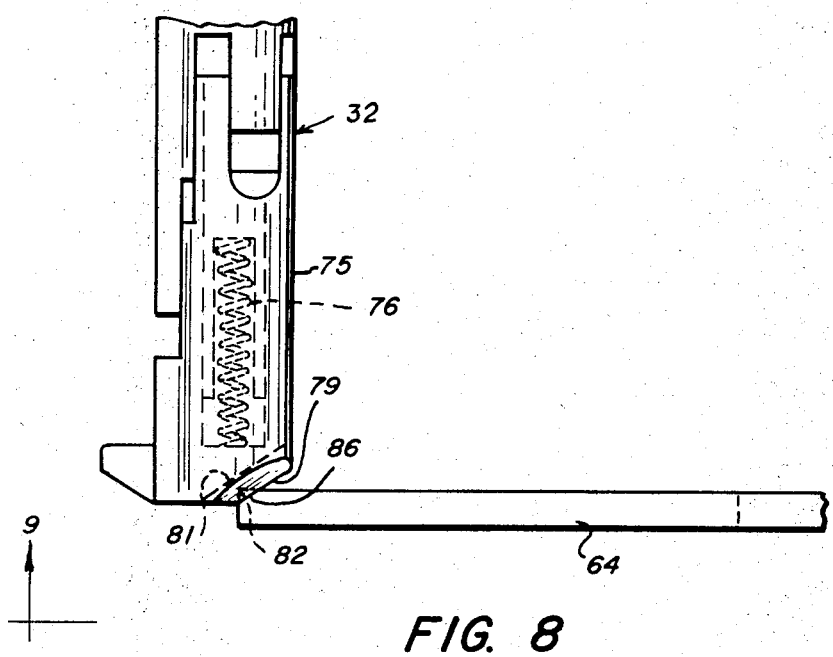
FIG. 8 is a view showing engagement of the feeder blade with the shoe member.

Referring to FIGS. 7 and 8, the end of the C-ring magazine 32 adjacent the entrance surface 51 is comprised of a magazine shoe member 75 which has the same basic cross section as the magazine 32. It is separate from the magazine 32 and is constantly biased toward the entrance surface 51 by a spring 76. Because of this construction the shoe member 75 has relative movement with respect to the entrance surface 51 which movement is slightly greater than twice the width of a C-ring 33. This enables a C-ring 33 and the feeder blade 64 to pass by the shoe member 75 together at the same time which can occur when the C-rings 33 are cemented together in a tilted plane so that only one end of the C-ring 33 feeds through and the other drags behind over the top of the feeder blade 64, all of which contributes to the anti-jamming ability of the device.

Figure 11:
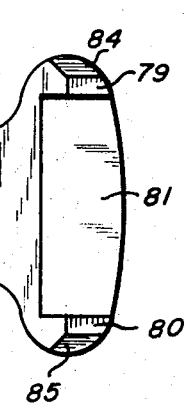
FIG. 11 is an end view of the shoe member.

The shoe member 75 is provided with first and second cam surfaces 79 and 80, respectively, as best seen in FIGS. 11, on opposite sides of the shoe member 75 and located in a position so as to be engaged by the first and second cam members 86 and 87 on the feeder blade 64. The shoe member 75 between its first and second cam surfaces 79 and 80 is provided with a recessed portion 81 which is constructed to prevent engagement with C-ring 33 contacting edges 82 and 83 of the feeder blade 64. It will be seen in FIG. 8 that the cam member 86 and the cam surface 79 which engage each other are swept back at an angle so as to provide efficient engagement and positive retraction of the shoe member 75 when engaged by the feeder blade 64. FIGS. 8 and 9 demonstrate movement of the feeder blade 64 into engagement with the shoe member 75 when a C-ring 33 is not present at the entrance surface and shows how feeding edge 82 of the feeder blade 64 clears recess 81 of the shoe member while the cam members 86 and 87 of the feeder blade 64 engage the cam surfaces 79 and 80 of the shoe member 75 allowing the feeder blade 64 to pass thereby.

Figure 12:
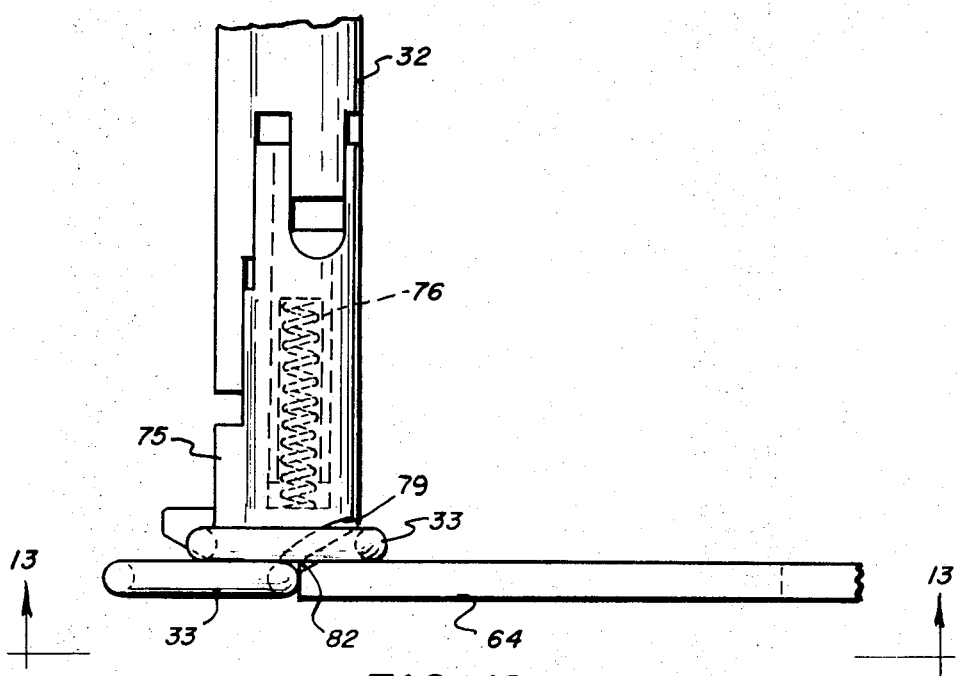
FIG. 12 is a view showing engagement of the feeder blade with a C-ring which in turn engages the shoe member.
Figure 13:
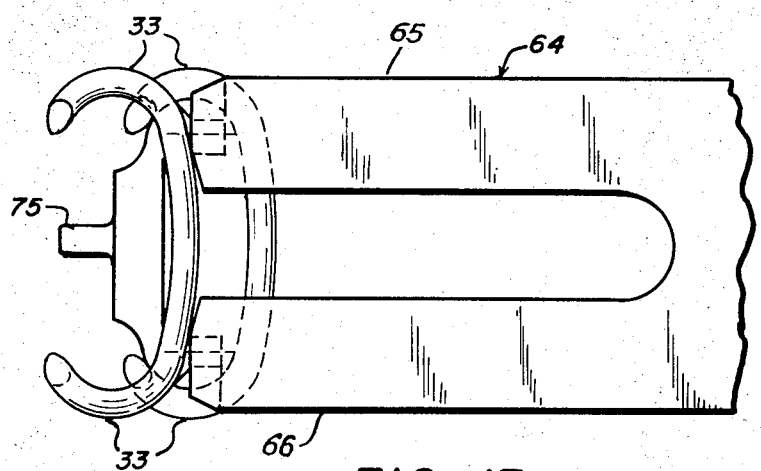
FIG. 13 is a view taken generally along the line 13—13 of FIG. 12.

FIGS. 12 and 13 are views like FIGS. 8 and 9; however, they show the engagement of the feeder blade 64 with a C-ring and in turn the C-ring with the shoe member 75 when the C-ring 33 is in position to be fed from the entrance surface 51 to the clinching surfaces 58 at the end of the jaws. It will be noted that the C-ring 33 initially engages the first and second cam surfaces 79 and 80 to retract the shoe member 75. The C-ring 33 is engaged by edges 82 and 83 on the feeder blade 64. Surfaces 84 and 85 on the shoe member 75 are clearance surfaces.

Referring to FIGS 3 and 5-7, a latch member 69 is mounted alongside the jaws and includes a guide wall 71 which is located between the jaws 40 and 41 and extends along the jaws from the entrance surface 51 to a point which substantially coincides and terminates with the termination of the ring feeding grooves 52 as they reach the clinching surfaces 58. This guide wall 71 is spring biased by leaf spring member 73 which is secured alongside jaws 40 and 41, as seen in FIG. 3, so that the guide wall 71 is always urged toward the ring feeding grooves 52. This guide wall 71 is brushed aside by the C-ring 33 as it travels toward the clinching grooves 58 and then snaps in behind the C-ring when it reaches clinching surfaces 58. The extreme end of the latch member 69 is formed into a back-up surface 72 which engages the C-ring 33 on its back side and prevents the C-ring 33 from buckling back into the ring feeding grooves 52 when the jaws 40 and 41 are actuated so as to bring the clinching surfaces 58 toward each other with subsequent clinching of the C-ring 33 carried thereby.

Figure 4:
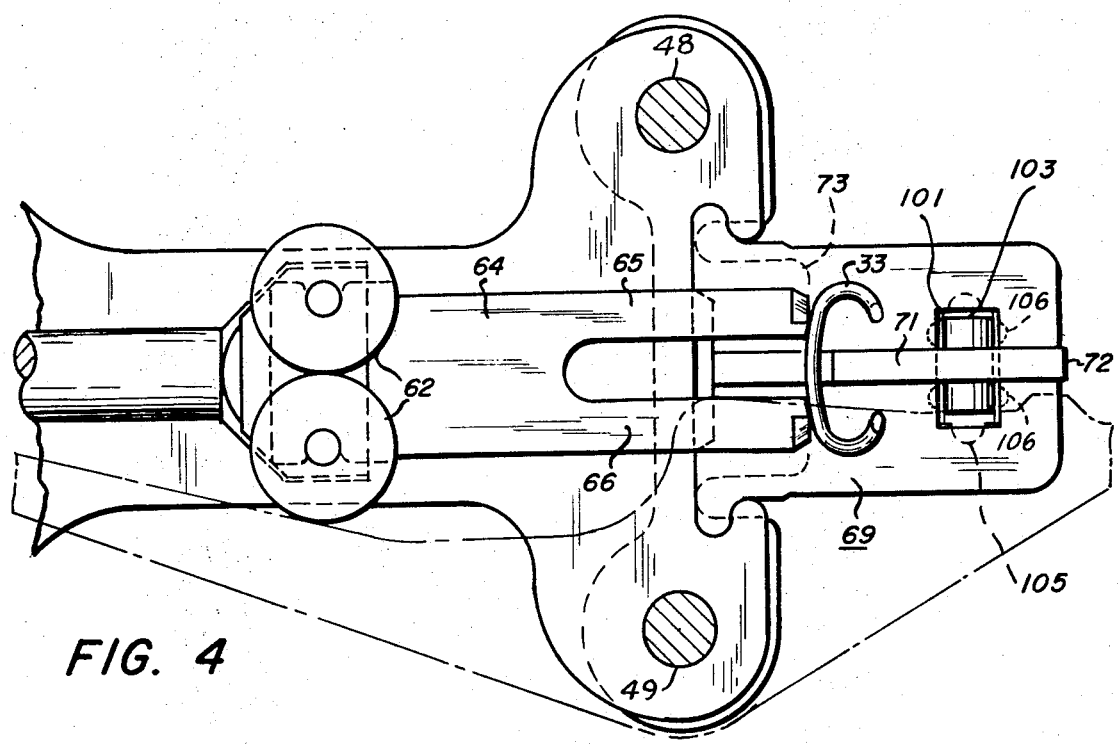
FIG. 4 is an enlarged view showing the right end of the tool as seen in FIG. 1 and with the feeder blade retracted from the position shown in FIG. 1.
Figure 5:
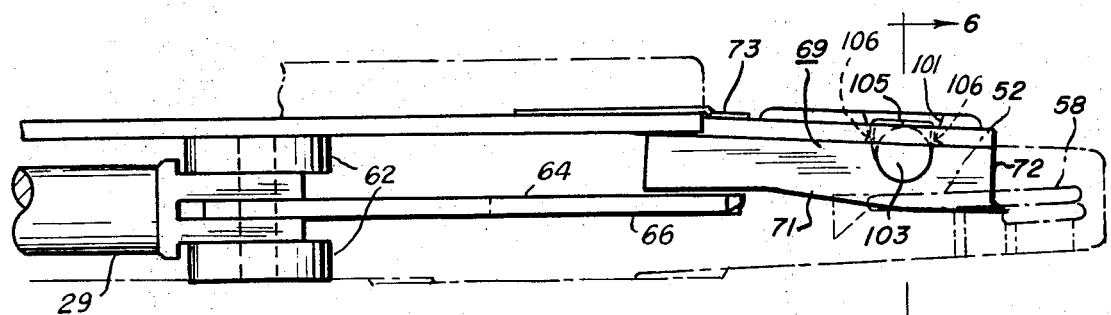
FIG. 5 is a plan view of the structure shown in FIG. 4.
Figure 6:
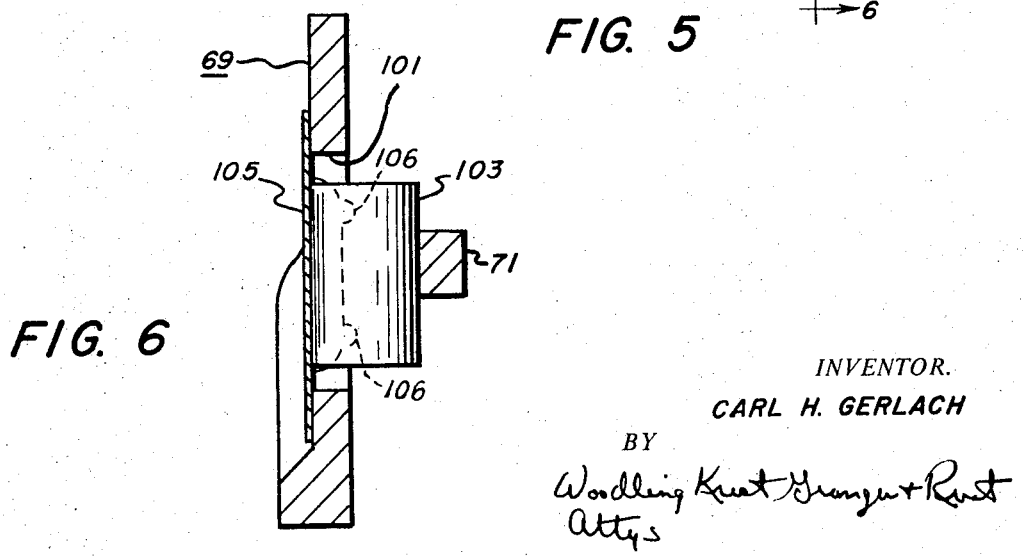
FIG. 6 is a view takein generally along the line 6—6 of FIG. 5 and turned 90° counterclockwise.

As best seen in FIGS. 4-6, the latch member 69 also includes wall means which form a jaw stop holder 101 which serves to hold and support a jaw stop 103. A removable clip 105 serves to prevent the jaw stop 103 from falling laterally out of the holder 101. The clip 105 has four ears 106 which snap it into recesses in the holder 101 to hold the stop 103 in place. It will be noted that, as seen in FIG. 14, the stop 103 is located in a position to engage the jaws 40 and 41 in their closing movement and limit the extent the jaws 40 and 41 can close. FIG. 14 shows the jaws in closed position with a stop 103 of a size to produce a 5/16" ring which is shown in FIG. 17. Different size stops 103 limit the closing movement of the jaws 40 and 41 and produce different size rings.

The operation of the device is essentially as follows. With the parts in the position shown in FIG. 1, pulling of the trigger 24 causes the piston 27 to move to the left as seen in FIG. 1 with engagement of the rollers 62 with cam surfaces 54 which causes the clinching surfaces 58 to travel toward each other with clinching of the C-ring 33. Closing movement of the jaws 40 and 41 is limited by engagement of the same with the jaw stop 103 and the intermediate portion of the C-ring 33 is supported by the back-up surface 72 which effects closing of the C-ring 33. This closing is shown in FIG. 14 and the formed ring is shown in FIG. 17. A shorter jaw stop 103 would produce a round ring of smaller size and a longer stop 103 would produce a round C-ring 33 of larger size. The movement of the piston 27 to the left during the clinching operation has also caused the feeder blade 64 to move to the left to the position shown in FIG. 4. When the piston 27 reaches the left end of the cylinder 26, air is introduced into the left end of the cylinder 26 by release of the trigger 24 causing the piston 27 to be moved back to the position shown in FIG. 1. This return movement to the right causes the feeding edges 82 and 83 carried by the feeder blade 64 to engage a C-ring 33 as shown in FIGS. 12 and 13, which causes the C-ring 33 to engage the cam surfaces 79 and 80 moving the shoe member 75 away from the entrance surface 51 with subsequent pushing of the C-ring 33 to the clinching surfaces 58. The C-ring 33 is then located in position to be clinched with back-up surface 72 preventing buckling backwards of the C-ring 33. In the event there is no C-ring in position on surface 51, cam members 86 and 87 engage cam surfaces 79 and 80 to permit feeder blade 64 to pass by the shoe member 75. The shoe member 75 is capable of retracting from surface 51 a distance sufficient to accommodate the thickness of blade 64 and the thickness of a C-ring 33 which contributes to preventing jamming of the device.

It will therefore be seen that a tool for clinching C-rings has been provided which has an extremely efficient means for feeding C-rings from a magazine to clinching jaws and the tool can also form circular rings to many selected sizes by the use of the adjustable jaw stop mechanism.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A C-ring clinching apparatus including in combination first and second pivotally mounted jaws, clinching grooves formed on facing portions of said jaws and adapted to receive C-rings to be clinched, a latch member positioned to engage the back of a C-ring located in said clinching jaws to prevent buckling of the C-rings during clinching movement of said jaws, jaw stop means carried by said latch member located in the path of travel of said jaws to limit the stopping point of the clinching movement of the same and thereby selectively form C-rings.

2. A C-ring clinching apparatus as claimed in claim 1 wherein said jaw stop means comprises a holder within which is removably positioned a jaw stop member of a given size.

3. A C-ring clinching apparatus as claimed in claim 2, wherein said jaw stop means are carried by said latch member and a closure member retains said stop member with said holder.

4. A fastener clinching apparatus comprising, in combination, a pair of pivotally mounted jaws, each of said jaws having a clinching groove adapted to clinch a fastener therebetween when said jaws are closed, a latch member positioned to engage the back of such fastener located in said clinching grooves to prevent movement out of said grooves by such fastener, and a jaw stop means secured to said latch member and located between said jaws to limit the amount of closure of said jaws to thus limit the amount of clinching of said fastener therebetween.

5. The fastener clinching apparatus of claim 4 wherein said jaw stop means is removably secured to said latch member and comprises an elongate stop means extending lengthwise between said pivotally mounted jaws whereby variations in the length of said jaw stop will vary the amount of closure of said jaws.

References Cited

UNITED STATES PATENTS

| | | | |
|---|---|---|---|
| 2,656,539 | 10/1953 | Chilton | 72—407 |
| 2,867,808 | 1/1959 | Van Sittert | 72—407 |
| 2,921,315 | 1/1960 | Albrecht | 72—407 |
| 3,013,270 | 12/1961 | Chilton | 72—407 |
| 3,026,520 | 3/1962 | Albrecht | 72—407 |

CHARLES W. LANHAM, Primary Examiner

G. P. CROSBY, Assistant Examiner

U.S. Cl. X.R.

72—453